(12) United States Patent
Garg et al.

(10) Patent No.: US 12,005,859 B2
(45) Date of Patent: Jun. 11, 2024

(54) VEHICLE REMOTE START CONTROLLER

(71) Applicant: T-Mobile USA, Inc., Bellevue, WA (US)

(72) Inventors: Parag Garg, Woodinville, WA (US); Nicholas LaVassar, Issaquah, WA (US); Zohebulla Bangalore Sanaulla, Bellevue, WA (US); Dhruv Chadha, Kirkland, WA (US); Mehdi Piraee, Bothell, WA (US); Joseph Baird, Kent, WA (US); Evan Ingardia, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 612 days.

(21) Appl. No.: 17/173,005

(22) Filed: Feb. 10, 2021

(65) Prior Publication Data
US 2022/0250583 A1 Aug. 11, 2022

(51) Int. Cl.
| | | |
|---|---|---|
| *B60R 25/24* | (2013.01) | |
| *B60R 25/102* | (2013.01) | |
| *B60R 25/31* | (2013.01) | |
| *B60R 25/33* | (2013.01) | |
| *B60R 25/34* | (2013.01) | |
| *B60R 25/04* | (2013.01) | |
| *B60R 25/20* | (2013.01) | |

(52) U.S. Cl.
CPC ............ *B60R 25/24* (2013.01); *B60R 25/102* (2013.01); *B60R 25/31* (2013.01); *B60R 25/33* (2013.01); *B60R 25/34* (2013.01); *B60R 25/04* (2013.01); *B60R 25/209* (2013.01)

(58) Field of Classification Search
CPC ....... B60R 25/24; B60R 25/102; B60R 25/31; B60R 25/33; B60R 25/34; B60R 25/04; B60R 25/209
USPC ............................................................ 701/2
See application file for complete search history.

(56) References Cited

U.S. PATENT DOCUMENTS

| | | | |
|---|---|---|---|
| 6,853,895 B2 | 2/2005 | Javaherian | |
| 8,112,185 B2 | 2/2012 | Wu | |
| 9,983,013 B1* | 5/2018 | Krunic | ............... G01C 21/3644 |
| 10,167,836 B2 | 1/2019 | Holub et al. | |
| 2013/0332024 A1* | 12/2013 | Garrett | ................... H04L 67/12 |
| | | | 701/1 |
| 2016/0321080 A1* | 11/2016 | Cepuran | ................. G01S 19/39 |
| 2019/0066834 A1* | 2/2019 | Tuyl | ...................... G16H 20/70 |

(Continued)

FOREIGN PATENT DOCUMENTS

| | | | |
|---|---|---|---|
| CN | 104276133 | * | 1/2015 |
| CN | 110599073 | * | 12/2019 |

(Continued)

*Primary Examiner* — Muhammad Shafi

(57) ABSTRACT

This disclosure describes techniques that enable a vehicle remote start controller to initiate a remote start of an idle vehicle. The remote start controller may retrieve sensor data associated with a vehicle and analyze the sensor data to determine the current state of the vehicle. In doing so, the remote start controller may determine whether to initiate a remote start of the vehicle based at least in part on the current state. In response to determining to initiate the remote start, the remote start controller may generate computer-executable instructions for delivery to the vehicle that initiates the remote start.

15 Claims, 6 Drawing Sheets

(56) References Cited

U.S. PATENT DOCUMENTS

2019/0176752 A1* 6/2019 Cermak ................ B60R 25/209
2021/0009057 A1* 1/2021 Ihlenburg .............. B60R 16/037

FOREIGN PATENT DOCUMENTS

DE 102018112394 A1 * 11/2018 ............. F01N 3/023
KR 200177143 * 4/2000

* cited by examiner

VEHICLE REMOTE START CONTROLLER

BACKGROUND

Present-day, some automotive vehicles have the capability for remote starting by the operator. The operator could always manually start the engine and leave the vehicle until the interior was heated (or cooled) to a comfortable temperature, or the operator was otherwise ready to leave. Now, an operator has the opportunity of using a remote electronic key to start the engine just as a remote key can be used to unlock vehicle doors.

In remote start situations, the operator can expect to have the vehicle engine warm and the passenger compartment at a comfortable temperature when he/she chooses to enter the vehicle. However, initiating a remote start of a vehicle can be influenced by factors other than an operator's request to initiate a remote start. Therefore, for an operator to ensure that a vehicle is ready at a set time of departure, the operator may need to consider factors other than the set time of departure when selecting a time to initiate the remote start. Such factors may include ambient conditions within the vehicle and external environmental conditions outside the vehicle, each of which may influence whether, and when, to initiate a remote start.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
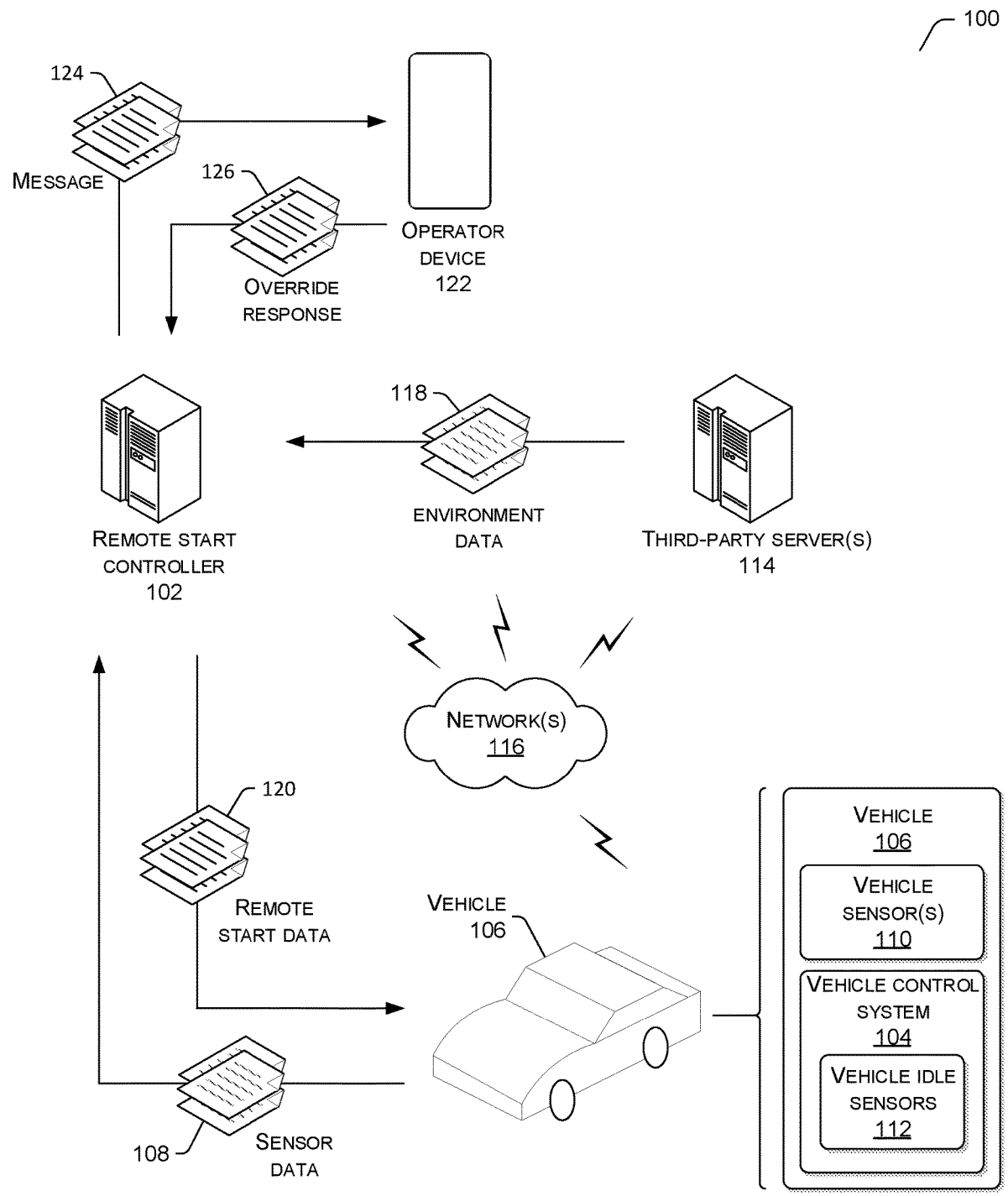
FIG. 1 illustrates an example computing environment that facilitates the operation of a remote start controller.

This disclosure describes techniques to facilitate the remote start of an automotive vehicle. While current remote electronic key technology allows for a remote engine start of automotive vehicles, present technology relies on an operator's request to initiate the remote start. This disclosure describes a remote start controller that is configured to analyze environmental factors other than an operator's request to initiate a remote start to determine whether to initiate a remote start and, in some cases, when to initiate a remote start. The term "remote start," as used herein may include a remote start of a vehicle engine to initiate an engine warm-up sequence that is set to conclude at a set vehicle departure time. The remote start may also include a remote start of vehicle climate controls to ensure that a vehicle cabin reaches an operating temperature and climate prior to the set vehicle departure time.

The remote start controller may preemptively initiate a remote start without operator intervention, based on an inferred pattern of operator behavior. The remote start controller may develop an operator profile based on historical instances of drive cycles. A drive cycle may correspond to the time period that the vehicle engine is running, namely between engine start-up and engine shutdown. A drive cycle may or may not involve vehicle travel. For example, a drive cycle may correspond to the time period between starting an engine at point A, traveling to point B, and then shutting down the engine at point B. A drive cycle may also correspond to the time period between starting the engine at point A and shutting down the engine at point A.

Using the operator profile, the remote start controller may infer impending operator drive cycles based on the time of day or the day of the week. For example, if an operator regularly drives to work each weekday morning at 8 am (e.g., a drive cycle), the remote start controller may detect the pattern of operator drive cycles, and in doing preemptively initiate a remote start each weekday morning prior to the 8 am departure time. The remote start controller may infer a start time to initiate a remote start, which necessarily precedes the set departure time.

In one embodiment, the remote start controller may interact with a vehicle control system of a vehicle to initiate a remote start. The vehicle control system may reside within the vehicle or may be accessed by the vehicle, via one or more network(s). The vehicle control system may be configured to capture sensor data from one or more sensor(s) associated with the vehicle. The one or more sensor(s) may include vehicle sensors and vehicle idle sensor(s).

The vehicle sensors may include, without limitation, sensors that are integrated as part of the vehicle, independent of the vehicle control system. Vehicle sensors may include, without limitation, a Global Positioning Sensor (GPS), a battery charge state sensor, a fuel reserve state sensor, and/or a cabin temperature sensor. Vehicle idle sensor(s) correspond to sensors introduced to the vehicle, as part of the vehicle control system.

Vehicle idle sensor(s) may include sensors that functionally overlap vehicle sensors, and additional sensors such as, and without limitation, vehicle cabin and external temperature sensors, thermal sensors, audio sensors, motion sensors, camera sensors, or accelerometer sensors.

The remote start controller may retrieve sensor data from a vehicle continuously, per a predetermined schedule, or in response to a triggering event. The predetermined schedule may be any suitable time interval, such as five minutes, ten minutes, or 30 minutes. The triggering event may be receipt of a request from an operator device to initiate a remote start. Another triggering event may include an indication from the vehicle control system that a vehicle cabin sensor has been triggered, potentially indicating the likely presence of an occupant (e.g., an individual or an animal) within the vehicle cabin. Yet another triggering event may include an indication of a battery charge state that is below a predetermined battery charge threshold.

The remote start controller may analyze the sensor data associated with the vehicle to determine the current state of the vehicle. Based on the current state of the vehicle, the remote start controller may determine whether to initiate a remote start. The current state of the vehicle may identify factors specific to the vehicle or the vehicle environment that may influence whether to initiate a remote start or when to initiate a remote start. Factors specific to the vehicle may include, without limitation, a battery charge state or a fuel reserve state. Factors specific to the vehicle environment may include, without limitation, external environmental conditions, and whether the vehicle is parked indoors or outdoors.

In one embodiment, the remote start controller may analyze geolocation data (e.g., GPS sensor data) and visual data (e.g., camera sensor) associated with the vehicle to determine whether the vehicle is parked indoors or outdoors. In this example, the remote start controller may infer a current state of the vehicle as idle and that the vehicle is located within an indoor single, dual, or tri-parking garage (e.g., residential garage), an indoor multi-level, multi-car parking garage (e.g., building complex garage), or in an outdoor parking space. If the vehicle is idle and parked within an indoor single, dual, or tri-parking garage (e.g., the current state of the vehicle), the remote start controller may elect to forgo a remote start to avoid having the confined space overwhelmed with carbon monoxide toxins. In contrast, the remote start controller may elect to initiate a remote start if the vehicle is idle and parked in a multi-car parking garage or idle and parked in an outdoor parking space (e.g., the current state of the vehicle).

In another embodiment, the remote start controller may analyze external environmental data associated with the geolocation of the vehicle to determine when to initiate a remote start for a vehicle engine. External environmental data may be accessed via third-party servers that are communicatively coupled to the remote start controller. Alternatively, or additionally, external environmental data may be based on one or more sensor(s) associated with the vehicle. The external environmental data may indicate an external air temperature at the geolocation of the vehicle. Further, the remote start controller may analyze temperature data within the vehicle cabin to determine whether to initiate vehicle cabin environment controls. For example, if the vehicle cabin temperature is within a preferred temperature range of the operator of the vehicle, the remote start controller may elect to forgo initiating vehicle cabin environment controls.

The remote start controller may determine a time interval for engine warmup and vehicle cabin environment controls (e.g., heating/cooling of the vehicle cabin). The time interval may be based on external environmental conditions or engine warmup guidelines for the vehicle. The time interval may be used to determine a point-in-time, prior to the set departure time, to initiate the remote start. For example, consider a vehicle that is set to depart at 8 am. Based on the analysis of external environmental conditions and/or engine warmup guidelines, the remote start controller may determine that the engine warm-up and vehicle cabin environment controls each require ten minutes to reach operating temperatures. Subsequently, the remote start controller may initiate the remote start at 7:50 am, ten minutes prior to the set departure time.

In some examples, the remote start controller may determine that the time interval for engine warm-up is different to the time interval for vehicle cabin environment controls, and in doing so, set two different points in time, prior to a set departure time; one point-in-time to initiate a remote engine start and a second point-in-time to initiate a remote start for vehicle cabin environment controls. Continuing with the previous example, consider a vehicle engine that requires an engine warmup period of ten minutes and a vehicle cabin environment controls that require three minutes to reach an operating temperature. The operating temperature may be set by an operator of the vehicle. Here, the remote start controller may initiate the remote engine start at 7:50 am, ten minutes prior to the set departure time of 8 am, and further, initiate the remote start of the vehicle cabin environment controls at 7:57 am, three minutes prior to the set departure time.

In one embodiment, the remote start controller may initiate a remote start for reasons other than engine warm-up prior to a set departure time. For example, the remote start controller may analyze sensor data to determine that an occupant is likely within the vehicle cabin. Here, the remote start controller may use sensor data from a camera sensor, motion sensor, audio sensor, thermal sensor, or accelerometer (e.g., occupant initiates a rocking motion inside the vehicle) sensor, or any suitable combination thereof, to infer the presence of the occupant (e.g., the current state of the vehicle). The occupant may be an individual or an animal. In doing so, the remote start controller may initiate a remote start of the vehicle cabin environment controls to ensure that the cabin air temperature and air quality are breathable. The remote start controller may be communicatively connected to a vehicle's central door locking mechanism, electronic window mechanism, or both, and may selectively unlock the vehicle doors, wind down the electronic windows, or both.

Prior to unlocking the vehicle doors and winding down the windows, the remote start controller may transmit a message to an operator device associated with an operator of the vehicle, indicating the likely presence of an occupant within the vehicle cabin and providing selectable options to unlock the vehicle doors, wind down the windows, or both. Authorization to unlock the vehicle doors and wind down the windows creates an egress point from the vehicle, and if the occupant is a small child or an animal, egress outside the vehicle may pose a greater risk to the occupant's safety than remaining within the vehicle cabin.

In another embodiment, the remote start controller may analyze sensor data from a battery charge state sensor to determine the battery charge state of the vehicle. If the battery charge state is less than a predetermined battery charge threshold (e.g., the current state of the vehicle), the remote start controller may initiate a remote engine start to provide the battery with an opportunity to improve its charge state. In one example, the remote start controller may extend the engine warm-up period prior to a set departure time (e.g., initiate a remote engine start at an earlier point-in-time than what is typical for a set departure time). In another example, the remote start controller may initiate a remote engine start, independent of a set departure time, and keep the engine running until the battery charge state is at least equal to the predetermined battery charge threshold.

The remote start controller may consider other factors before initiating a remote engine start to improve a battery charge state. For example, the remote start controller may forgo the remote engine start if the fuel reserve state for the vehicle is less than a predetermined fuel reserve threshold, or if the vehicle is parked within an indoor environment. In these examples, the remote start controller may transmit a message to an operator device associated with the vehicle, indicating that the battery charge state is less than the predetermined battery charge threshold.

In another embodiment, the remote start controller may analyze sensor data from a fuel reserve sensor to determine the fuel reserve state of the vehicle. If the fuel reserve state is less than a predetermined fuel reserve threshold, the remote start controller may elect to reduce the engine warm-up period (e.g., initiate the remote engine start closer in time to the set departure time), to conserve fuel. Moreover, the remote start controller may elect to forgo controlling vehicle cabin temperature (e.g., warm vehicle cabin in cold conditions and cool vehicle cabin in warm conditions), and instead focus exclusively on a vehicle engine warm-up sequence.

The remote start controller may calculate the predetermined fuel reserve threshold for each drive cycle based on the expected fuel consumption that is likely to occur due to an impending drive cycle, or the expected fuel consumption that is likely to occur prior to the next refuel opportunity. Here, the remote start controller may analyze an operator profile associated with an operator to infer the upcoming fuel consumption. The operator profile may be based on historical instances of drive cycles.

In another embodiment, the remote start controller may determine whether the vehicle has been idle for an extended period (e.g., the current state of the vehicle), which in some cases may hasten the wear and tear on the vehicle engine and its components. If the vehicle has been idle for a period greater than or equal to a predetermined idle period, the remote start controller may initiate a remote engine start to warm the vehicle engine and, subsequently, ward off the risk of hastened wear and tear.

In response to the vehicle remote controller determining that a remote start of the vehicle is to be initiated, the vehicle remote controller may generate remote start data for delivery to the vehicle remote system of the vehicle. The remote start data may include computer-executable instructions that initiate the remote start of the vehicle. The remote start may initiate a vehicle engine-start, a remote start of vehicle cabin environment controls (e.g., heat/cool cabin based on detected ambient temperature within the vehicle cabin), or a suitable combination of both. The remote start data may further include an indication of a point-in-time to initiate the remote start. In some embodiments, the remote start data may indicate a vehicle engine-start at a different point-in-time relative to a vehicle cabin environment control. In other embodiments, the vehicle engine-start and vehicle cabin environment control may be initiated at the same time.

In response to the vehicle remote controller electing not to initiate a remote start of the vehicle, the vehicle remote controller may generate a message for delivery to an operator device. The message may indicate that a remote start was not initiated. In some examples, the message may further include a selectable option for the operator device to override the vehicle remote controller decision, and instead, initiate the remote start. The selectable option may be available for instances where personal safety is not compromised. For example, if the vehicle remote controller infers that the vehicle is parked indoors, it may forgo providing the selectable option to prevent the buildup of carbon monoxide and/or other toxic gases within the indoor environment.

While this disclosure focuses its description on a combustion engine vehicle, whereby an engine warm up sequence is typically required, one of ordinary skill in art may appreciate that variations and modifications can be made such that the vehicle control system may perform substantially equivalent functions to initiate a remote start of an electric vehicle. In that regard, rather than determining an engine warm up sequence, the vehicle control system may determine whether the drivetrain battery charge state (e.g., equivalent to the fuel reserve state of a combustion engine vehicle) of the electric vehicle is equal to or above a drivetrain battery charge threshold. The drivetrain battery charge threshold may be set by an operator of the vehicle control system, a vehicle service agency, or an equipment manufacturer. Based on a relative comparison of the drivetrain battery charge state to the drivetrain battery charge threshold, the vehicle control system may perform the various control functions, absent the engine warm up sequence, described within this disclosure. Without limitation, the various functions may include triggering a remote start of the vehicle climate controls.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example computing environment that facilitates the operation of a remote start controller. In the illustrated example, the remote start controller 102 may be communicatively coupled to a vehicle control system 104 associated with a vehicle 106. In the illustrated embodiment, the vehicle control system 104 may act as an intermediary system between the remote start controller 102 and the vehicle 106. For example, the vehicle control system 104 may be configured to monitor one or more sensor(s) associated with the vehicle 106 and transmit the corresponding sensor data 108 to the remote start controller 102. The one or more sensor(s) may include vehicle sensor(s) 110 that are integrated as part of the original manufacture of the vehicle 106 and vehicle idle sensor(s) 112 that are part of the vehicle control system 104. In some examples, the vehicle idle sensor(s) 112 may functionally overlap the vehicle sensor(s) 110.

While the vehicle control system 104 is described in FIG. 1 as an intermediary system between the remote start controller 102 and the vehicle 106, one of ordinary skill in the art may appreciate that variations and modification can be made such that the vehicle control system 104 may perform substantially equivalent functions to the remote start controller 102.

In the illustrated example, the remote start controller 102 may analyze the sensor data 108 to determine the current state of the vehicle, and in doing so, determine whether to initiate a remote start. If a remote start is to be initiated, the remote start controller 102 may further determine when to initiate the remote start.

In some embodiments, the remote start controller 102 may interact with the third-party server(s) 114, via the one or more network(s) 116, to determine the current state of the vehicle. For example, the remote start controller 102 may capture environment data 118 that indicates an external air temperature at the geolocation of the vehicle. Environment data 118 may be pertinent to determining the point-in-time to initiate a remote start to ensure that the engine and vehicle cabin reaches operating temperatures prior to a set departure time.

In response to determining to initiate a remote start (e.g., remote engine start, remote vehicle cabin environmental controls, or both), the remote start controller 102 may generate remote start data 120 for delivery to the vehicle control system 104. The remote start data 120 may include computer-executable instructions that initiate the remote start. The remote start data 120 may initiate a remote engine start at a first point-in-time, and a remote start of vehicle cabin environment controls at a second point-in-time. The first point-in-time may be the same as the second point-in-time. Alternatively, the first point-in-time may be different from the second point-in-time.

In the illustrated example, the remote start controller 102 may interact with an operator device 122 associated with the vehicle 106. In one embodiment, the remote start controller 102 may transmit a message 124 to the operator device 122 in response to denying a remote start. The message 124 may indicate a rationale for not initiating a remote start. The message 124 may selectively include a selectable option to override the decision to not initiate a remote start. By selecting the selectable option, the operator device 122 may transmit an override response 126 to the remote start controller 102, via the one or more network(s) 116. The remote start controller 102 may generate the remote start data 120 based at least in part on receipt of the override response 126.

In some examples, the message 124 may also include information relating to actions performed by the remote start controller 102. For example, the message 124 may indicate, without limitation, a remote engine start occurred at a point-in-time prior to an inferred set departure time, the remote engine start occurred due to the vehicle 106 being idle for an extended period, or the remote engine start occurred due to the battery charge state falling below a predetermined battery charge threshold. The message 124 may also indicate, without limitation, a remote start of vehicle cabin environment controls occurred at a point-in-time prior to an inferred set departure time, or because an occupant had been detected within the vehicle cabin.

The one or more network(s) 116 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Moreover, the operator device 122 may include any suitable electronic device, such as a television unit, a multimedia streaming device, a cellular phone, a smartphone, a tablet computer, an electronic reader, a media player, a gaming device, a personal computer (PC), a laptop computer, etc. The operator device 122 may also include network devices that act as intermediaries with the Internet. It is noteworthy that the Internet is accessible via one or more network(s) 116. In some examples, the operator device 122 may include a subscriber identity module (SIM), such as an eSIM, to identify each device to a telecommunication service provider (also referred to herein, as "telecommunications network").

The remote start controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the operator device 122 via the one or more network(s) 116.

Figure 2:
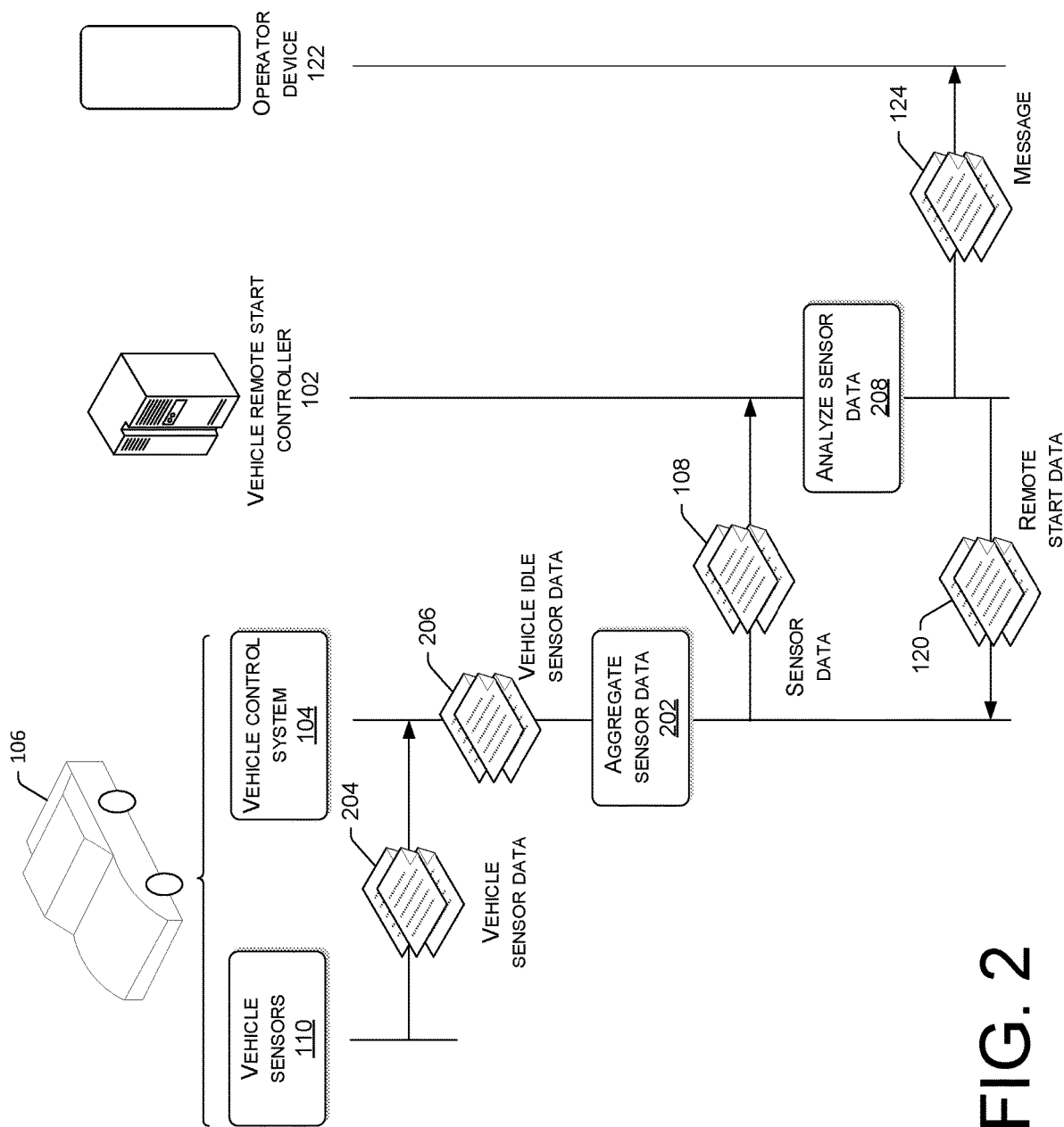
FIG. 2 illustrates a block diagram for an operation of the remote start controller, in accordance with at least one embodiment.

FIG. 2 illustrates a block diagram for an operation of the remote start controller, in accordance with at least one embodiment. In the illustrated example, the vehicle 106 may include a vehicle control system 104 that is communicatively coupled to vehicle sensor(s) 110 and vehicle idle sensor(s) 112. At 202, the vehicle control system 104 may generate sensor data 108 by aggregating vehicle sensor data 204 from the vehicle sensor(s) 110 and vehicle idle sensor data 206 from vehicle idle sensor(s) 112.

The vehicle control system 104 may transmit the sensor data 108 to the remote start controller 102. In one example, the vehicle control system 104 may push the sensor data 108 to the remote start controller 102 in response to a trigger event detected within the sensor data 108. For example, if the battery charge state of the vehicle battery falls below a predetermined battery charge threshold, the vehicle control system 104 may push the sensor data 108 to the remote start controller 102. In another embodiment, the remote start controller 102 may pull the sensor data 108 from the vehicle control system 104. For example, if the remote start controller 102 infers that an impending drive cycle is to occur, the remote start controller 102 may pull the sensor data 108 to support generating the remote start data.

At 208, the remote start controller 102 may analyze the sensor data 108 to determine whether to initiate a remote start. The remote start may correspond to a remote engine start, a remote start of vehicle cabin controls, or a suitable combination of both. If the remote start controller 102 elects to initiate a remote start, a point-in-time may be designated for the remote start. The point-in-time for a remote engine start may be the same as the point-in-time for a remote start of vehicle cabin controls. Alternatively, both points-in-time may be different.

If the remote start controller 102 elects to initiate a remote start, the remote start controller 102 may generate remote start data 120 for delivery to the vehicle control system 104. The remote start data 120 may include computer-executable instructions that initiate the remote start (e.g., remote engine start, a remote start of vehicle cabin controls, or a suitable combination of both) at designated points-in-time.

If the remote start controller 102 to not initiate a remote start, the remote start controller may transmit a message 124 to an operator device 122 associated with the vehicle 106, indicating that the remote start was not initiated. In some examples, the remote start controller 102 may transmit a message 124 to the operator device 122 as confirmation of initiating a remote start.

Figure 3:
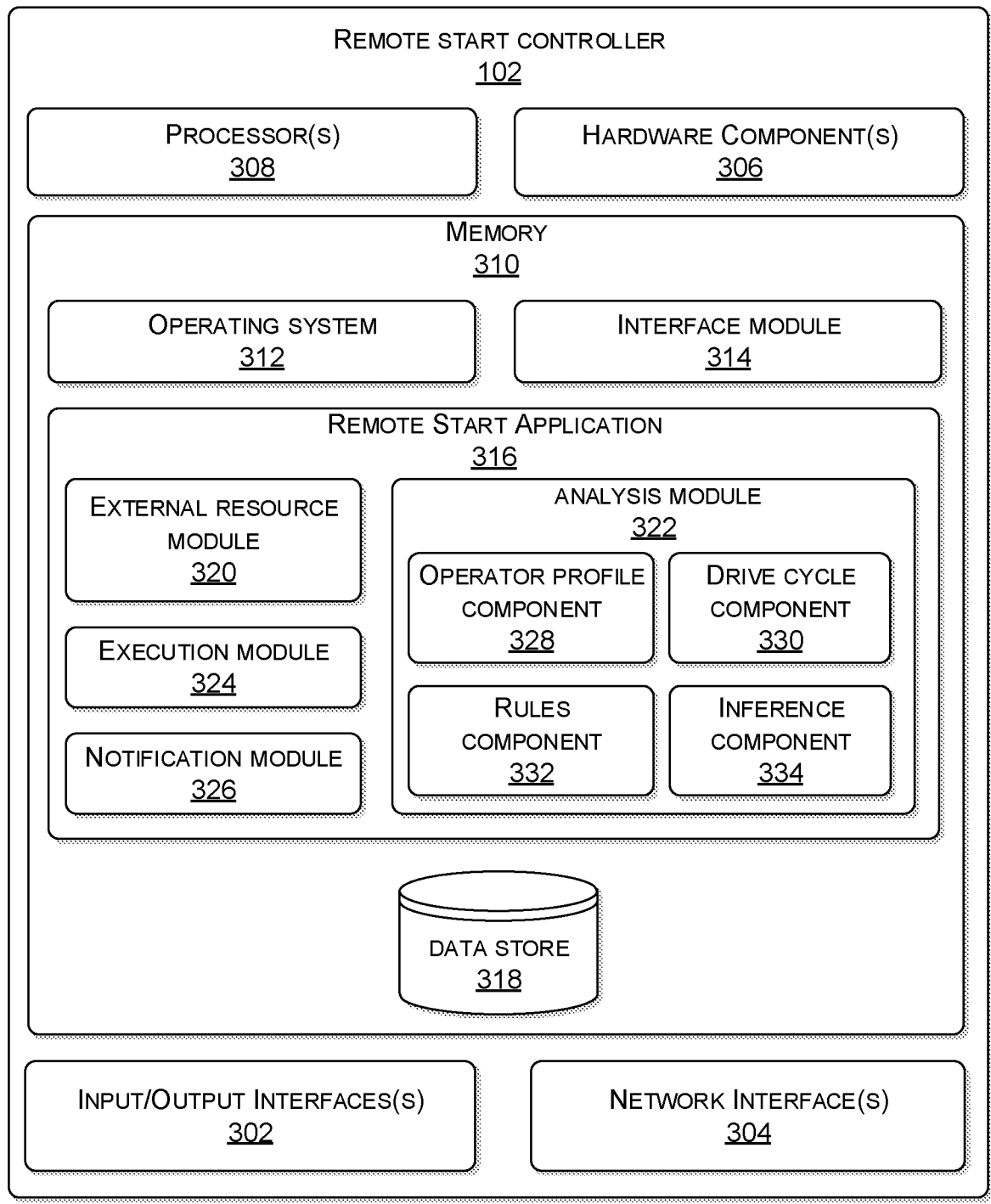
FIG. 3 illustrates various components of an example remote start controller that is able to start a vehicle based on various factors.

FIG. 3 illustrates various components of an example remote start controller. The remote start controller 102 may operate to receive sensor data 108 from a vehicle control system 104 of a vehicle 106, and in doing so determine whether to initiate remote start (e.g., remote engine start, remote vehicle cabin environment controls start, or both) of the vehicle 106. The remote start controller 102 may further determine a point-in-time to initiate the remote start.

The remote start controller 102 may include input/output interface(s) 302. The input/output interface(s) 302 may include any suitable types of output interface known in the art, such as a display (e.g., a liquid crystal display), speakers, a vibrating mechanism, or a tactile feedback mechanism. Input/output interface(s) 302 also includes ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the remote start controller 102 may include network interface(s) 304. The network interface(s) 304 may include any suitable sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the remote start controller 102 may include one or more processor(s) 308 that are operably connected to memory 310. In at least one example, the one or more processor(s) 308 may be a central processing unit(s) (CPU), graphics processing unit(s) (GPU), or both a CPU and GPU or any suitable sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any suitable non-transitory medium which can be used to store the desired information.

In the illustrated example, the memory 310 may include an operating system 312, an interface module 314, a remote start application 316, and a data store 318. The operating system 312 may be any suitable operating system capable of managing computer hardware and software resources. The operating system 312 may include an interface layer that enables applications to interface with the input/output interface(s) 302 and the network interface(s) 304.

The interface module 314 may be configured to interface with a vehicle control system 104 of a vehicle 106 to retrieve sensor data and transmit remote start data. The interface module 314 may be further configured to interface with the third-party server(s) 114 to retrieve third-party data, including, without limitation, environment data, engine warm-up times, engine start-up operating temperature, or operating battery charge.

The interface module 314 may further interact with an operator device to transmit messages relating to whether a remote start was initiated, and in some instances, to receive an override response to override a decision not to remote start the vehicle. The interface module 314 may also receive a request from an operator device 122 to initiate a remote start, which may trigger the remote start controller 102 to retrieve sensor data from the related vehicle.

The remote start application 316 may further include an external resource module 320, an analysis module 322, an execution module 324, and a notification module 326. The remote start application 316, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

The external resource module 320 may be configured to interface with third-party servers to retrieve third-party data such as external environmental conditions at a geolocation of the vehicle 106, operating start-up engine temperatures, operating engine warm-up times, operating engine start-up temperatures, an operating battery charge, or any suitable combination thereof.

The analysis module 322 may further include an operator profile component 328, a drive cycle component 330, rules component 332, and an inference component 334. The operator profile component 328 may be configured to generate an operator profile for each operator of the vehicle. The operator profile component 328 may identify an operator in several ways. An operator identity may be tied to an electronic key used to access the vehicle. Thus, an operator identity may be determined by the electronic key used to access the vehicle for a drive cycle. Additionally, or alternatively, the operator identity may be based on identifying an operator device associated with the operator. For example, the interface module 314 may detect an operator device within the vehicle via a wireless communication protocol, such as BLUETOOTH®. The operator may be identified based on a device identifier associated with the operator device.

In response to identifying an operator, the operator profile component 328 may retrieve, from the data store 318, historical instances of drive cycles of the vehicle performed by the operator over a predetermined time interval. Each historical instance of a drive cycle may include data points such as the operator identity, a time of day that the drive cycle began, a day of the week that the drive cycle began, starting geolocation (e.g., at engine startup), ending geolocation (e.g., at ending shutdown), fuel consumption, distance traveled, duration of the drive cycle, preferred vehicle cabin temperatures, and any other data pertinent to monitoring the performance of the vehicle during the drive cycle.

Accordingly, the operator profile component 328 may generate an operator profile model for each operator based on the historical instances of drive cycles of the vehicle performed by the operator. In one embodiment, the operator profile model may be used to infer impending drive cycles that the operator regularly performs. For example, the operator profile model may indicate that an operator regularly travels to a particular location (e.g., workplace) at 8 am each weekday. In another embodiment, the operator profile model may also indicate preferred, operating vehicle cabin temperatures for the operator. In yet another embodiment, the operator profile model may be used to infer fuel consumption of an impending drive cycle, based on historical instances of similar drive cycles.

The operator profile component 328 may continuously evaluate historical drive cycle data to progressively refine the operator profile model. As more historical drive cycle data becomes available, a continuously more accurate operator profile model can be developed.

The drive cycle component 330 may be configured to interact with the interface module 314 to capture sensor data from a vehicle 106 (e.g., vehicle control system 104) and aggregate the sensor data based on a common reference scale. The common reference scale may be time, drive cycle or a combination of both. If the sensor data is captured while the vehicle 106 is idle without an imminently foreseeable drive cycle, the sensor data may be aggregated based on a time scale. If the sensor data is captured prior to an impending drive cycle (e.g., to determine whether to initiate a remote start and if so, when to initiate the remote start), the sensor data may be aggregated based on the drive cycle. Sensor data captured during the drive cycle, for the purpose of monitoring vehicle systems (e.g., battery charge state and fuel reserve state), may be aggregated based on a time scale and the drive cycle.

The rules component 332 may be configured to determine one or more predetermined thresholds that govern if, and when, a remote start (e.g., remote engine start and/or remote start to a vehicle cabin environment controls) occurs. The predetermined thresholds may include a battery charge threshold, a fuel reserve state threshold. The rules component 332 may interact with the external resource module 320 to determine a predetermined battery charge threshold that can support an ignition and operation of the vehicle. Here, the external resource module 320 may interact with vehicle service agencies or equipment manufacturers to determine an operating battery charge threshold for the vehicle.

The rules component 332 may interact with the operator profile component 328 to determine the fuel reserve state threshold. The fuel reserve state may be based on a current fuel reserve within the vehicle and expected fuel consumption for an impending drive cycle or an expected fuel consumption until a next refuel opportunity. The rules component 332 may interact with the drive cycle component 330 to determine the current fuel reserve, and further interact with the operator profile component 328 to infer an expected fuel consumption for an impending drive cycle or until a next refuel opportunity.

The rules component 332 may further determine an operating engine temperature that an engine should attain after a warm-up sequence. Here, the rules component 332 may interact with the external resource module 320 to identify the operating start-up engine temperature from vehicle service agencies or equipment manufacturers. The rules component 332 may also determine a preferred operating vehicle cabin temperature for the operator of the vehicle based on data from the operator profile component 328.

The inference component 334 may employ one or more machine-learning algorithms to infer a current state of the vehicle, based at least in part on the data from the analysis module 322. The inference component 334 may interact with the drive cycle component 330 and the operator profile component 328 to infer the current state of the vehicle. By way of example, the current state of the vehicle may be based on factors such as the external environmental conditions at a geolocation of the vehicle, ambient conditions (e.g., vehicle cabin temperature) within the vehicle cabin, detecting an occupant within the vehicle, a battery charge state of the vehicle, a current fuel reserve state of the vehicle, an impending fuel reserve state based on the expected fuel consumption of an impending drive cycle, a determination of whether the vehicle is located within an indoor area or an outdoor area, or any suitable combination thereof.

Further, the inference component 334 may determine whether to initiate a remote start of the vehicle based on the inferred current state of the vehicle. Further, if the inference component 334 elects to initiate a remote start of the vehicle, the inference component 334 may indicate when to initiate the remote start. In some examples, the inference component 334 may interact with the rules component 332 to identify predetermined thresholds relating to battery charge state, or fuel reserve state thresholds. The rules component 332 may also provide instructions relating to an operating engine temperature and a preferred operating vehicle cabin temperature for the operator. The latter two data points may be instructive in determining the point-in-time in which to initiate the remote start (e.g., remote engine start, the remote start of vehicle cabin environment controls, or a combination of both).

If the inference component 334 elects not to initiate a remote start, the inference component 334 may interact with the notification module 326 to provide the operator device 122 with a selectable option to override the decision not to initiate the remote start. The inference component 334 may reserve providing the opportunity to override a decision not to initiate a remote start for instances where personal safety is not compromised. For example, if the inference component 334 infers that the vehicle 106 is parked indoors, it may forgo providing the selectable option to prevent the buildup of carbon monoxide toxins within the indoor environment.

The execution module 324 may be configured to generate remote start data for delivery to a vehicle control system 104 of a vehicle 106. The remote start data may include computer-executable instructions that initiate the remote start of the vehicle. The remote start may initiate a vehicle engine-start, a remote start of vehicle cabin environment controls (e.g., heat/cool cabin based on detected ambient temperature within the vehicle cabin), or a suitable combination of both.

The remote start data may further include an indication of a point-in-time to initiate the remote start. The remote engine start may occur at the same time as a remote start of the vehicle cabin environment controls. Alternatively, they may occur at different times.

The notification module 326 may interact with the execution module 324 and the inference component 334 to determine whether a remote start was initiated. Further, the notification module 326 may be configured to generate a message for delivery to an operator device 122 indicating whether a remote start was initiated. The notification module 326 may interface with the inference component 334 to selectively include a selectable option to override a decision not to initiate a remote start. By selecting the selectable option, the operator device 122 may transmit an override response 126 to the remote start controller 102, received at the interface module 314, to initiate the remote start.

The data store 318 may include a repository of operator profiles, data sourced from third-party servers, historical instances of drive cycles, sensor data, remote start data, and any suitable data pertinent to an operation of the remote start controller 102.

Figure 4:
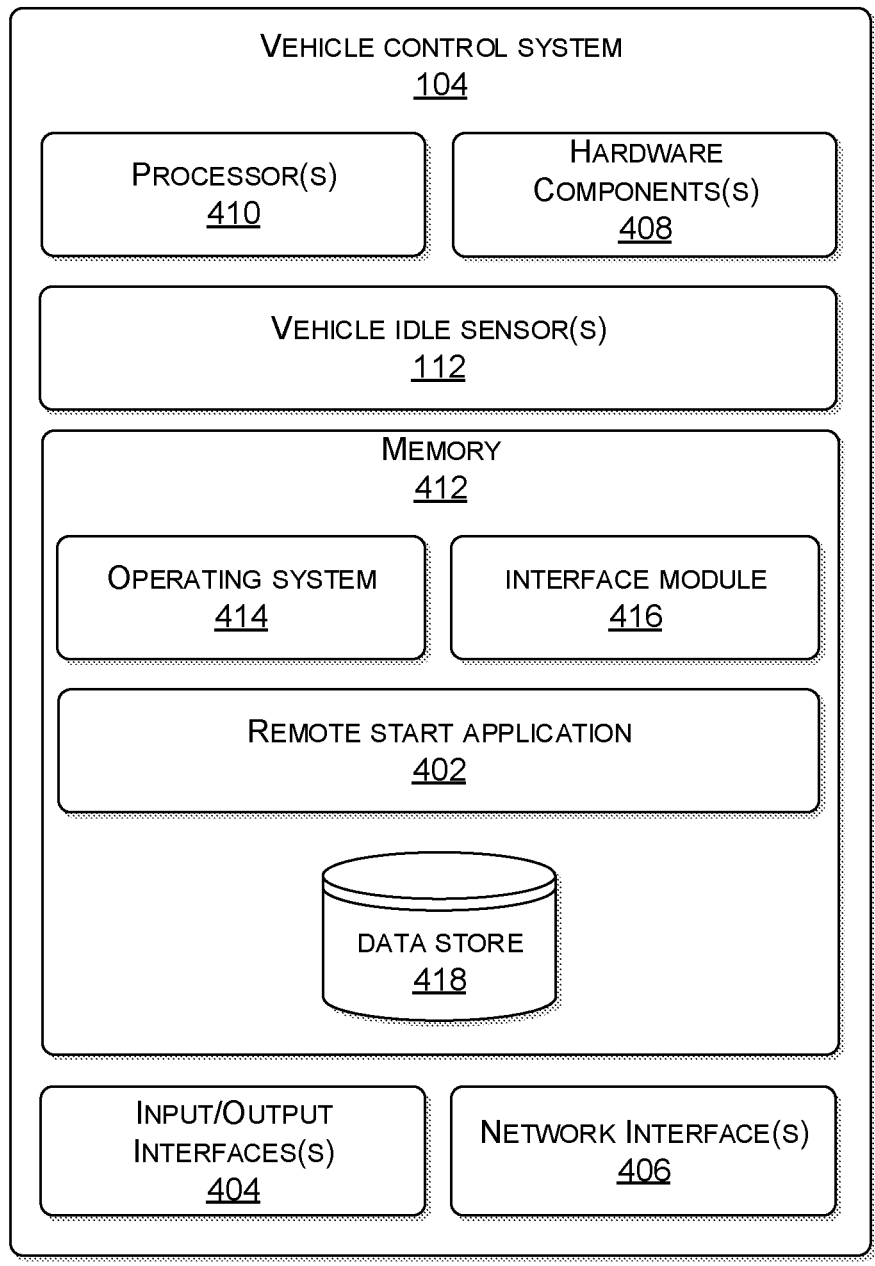
FIG. 4 illustrates various components of an example vehicle control system of a vehicle that interacts with a remote start controller to initiate a remote start of the vehicle.

FIG. 4 illustrates various components of an example vehicle control system. The vehicle control system 104 may reside in the vehicle or may reside on a remote server that is accessible by the vehicle via one or more network(s). In one embodiment, the vehicle control system 104 may act as an intermediary system between the remote start controller 102 and the vehicle 106. The vehicle control system 104 may capture sensor data from the vehicle 106 for delivery to the remote start controller 102. The vehicle control system 104 may receive remote start data 120 from the remote start controller 102 to initiate a remote start of the vehicle 106. In another embodiment, the vehicle control system 104 may perform substantially all functions of the remote start controller 102. In this latter embodiment, the remote start application 402 of the vehicle control system 104 may be functionally similar to the remote start application 316 of the remote start controller 102.

The vehicle control system 104 may include input/output interface(s) 404 and network interface(s) 406. The input/output interface(s) 404 may be functionally similar to input/output interface(s) 302, and the network interface(s) 406 may be similar to network interface(s) 304. Hardware component(s) 408 may include additional hardware interface, data communication hardware, and data storage hardware.

The vehicle control system 104 may include the vehicle idle sensor(s) 112. The vehicle idle sensor(s) 112 may include, without limitation, sensors that functionally overlap vehicle sensors, and additional sensors such as, vehicle cabin and external temperature sensors, thermal sensors, audio sensors, motion sensors, camera sensors, or accelerometer sensors.

Temperature sensors may be used to indicate temperature within the vehicle cabin. Thermal sensors may be used to detect the presence of individuals or animals within the vehicle cabin. Audio sensors may be used to detect audio within the vehicle cabin, which in turn may be used to infer the presence of individuals or animals within the vehicle cabin. Motion sensors may be used to detect movement within the vehicle cabin, which in turn may be used to infer the presence of individuals or animals within the vehicle cabin. Camera sensors may be used to detect movement within the vehicle cabin and to determine whether the vehicle is parked in an indoor garage or an outdoor parking space. Accelerometer sensors may be used to detect movement of the vehicle cabin itself, which in turn may be used to infer that the vehicle, when idle, was involved in an accident (e.g., another vehicle or moving object collision with the idle vehicle). In this latter example, the remote start controller may use the sensor data from an accelerometer to terminate a remote start that had already been initiated, based on inferring that the vehicle was involved in an accident.

The vehicle control system 104 may include one or more processor(s) 410 that are operably connected to memory 412. The one or more processor(s) 410 may be functionally similar to the one or more processor(s) 308, and the memory 412 may be similar to the memory 310.

The memory 412 may include an operating system 414, an interface module 416, a remote start application 402, and a data store 418. The operating system 414 may be any suitable operating system capable of managing computer hardware and software resources. The operating system 414 may include an interface layer that enables applications to interface with the input/output interface(s) 404 and the network interface(s) 406.

The interface module 416 may be configured to interact with the remote start controller 102. Here, the interface module 416 may transmit sensor data from the vehicle idle sensor(s) 112 to the remote start controller 102, and in return, receive remote start data to initiate a remote start (e.g., remote engine start, the remote start of vehicle cabin environment controls, or a combination of both).

In an alternate embodiment whereby the vehicle control system 104 performs substantially equivalent functions to the remote start controller 102, the interface module 416 may also interact with the third-party server(s) 114 and an operator device 122 in a functionally similar way to interface module 314.

The remote start application 402 may act as an intermediary between the vehicle and the remote start controller 102. The remote start application 402 may monitor the vehicle idle sensor(s) 112 and capture the sensor data continuously, per a predetermined schedule, or in response to a triggering event. The predetermined schedule may be any suitable time interval, such as five minutes, ten minutes, or 30 minutes. The triggering event may be receipt of a request from an operator device to initiate a remote start. Another triggering event may include an indication from an idle vehicle sensor that is typically dormant while the vehicle is idle (e.g., motion sensor within the vehicle cabin).

In an alternate embodiment whereby the vehicle control system 104 performs substantially equivalent functions to the remote start controller 102, the remote start application 402 may be functionally similar to the remote start application 316. The data store 418 may include a repository of sensor data, remote start data, and any suitable data pertinent to an operation of the vehicle control system 104.

Figure 5:
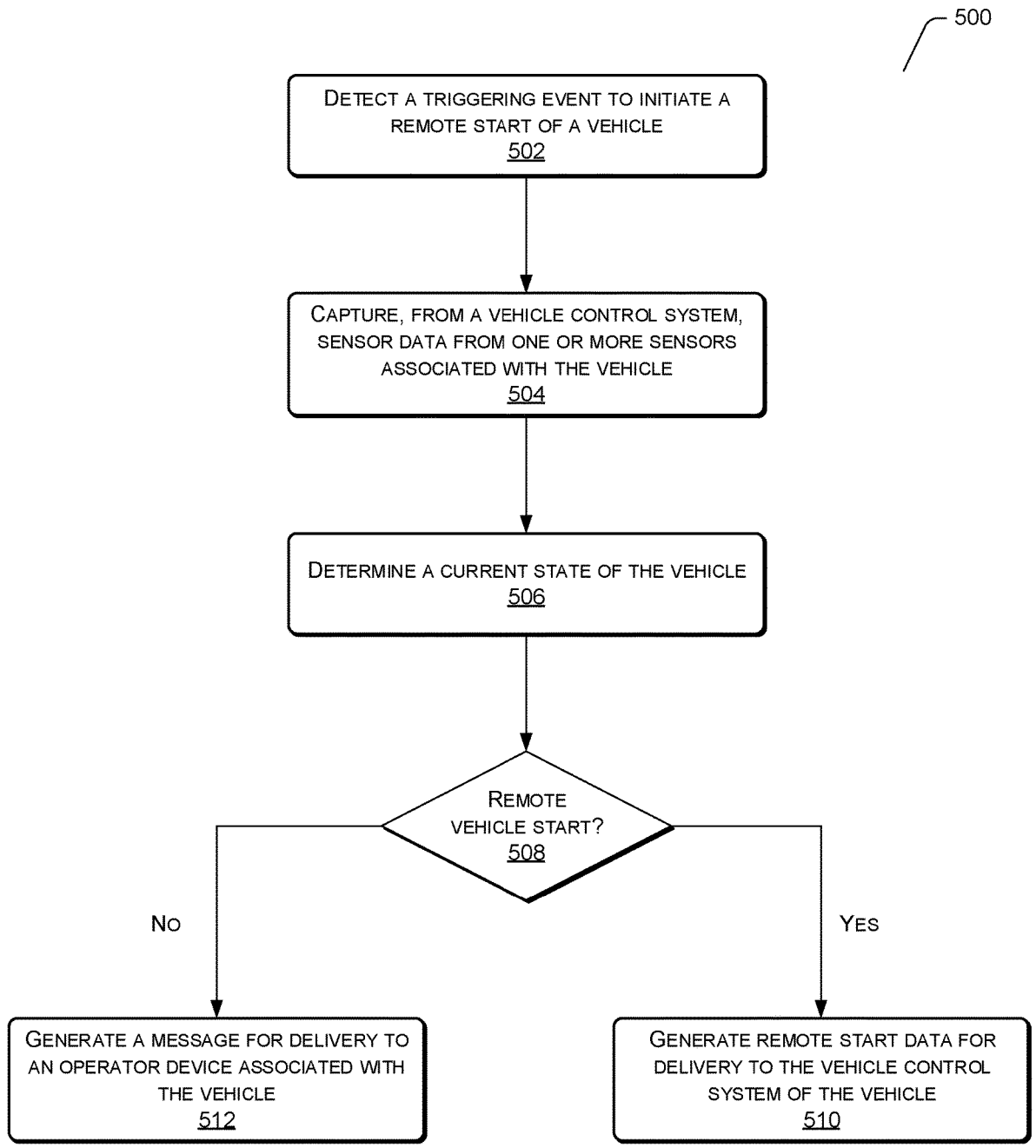
FIG. 5 illustrates an exemplary process for determining whether to initiate a remote start of a vehicle based on various factors.
Figure 6:
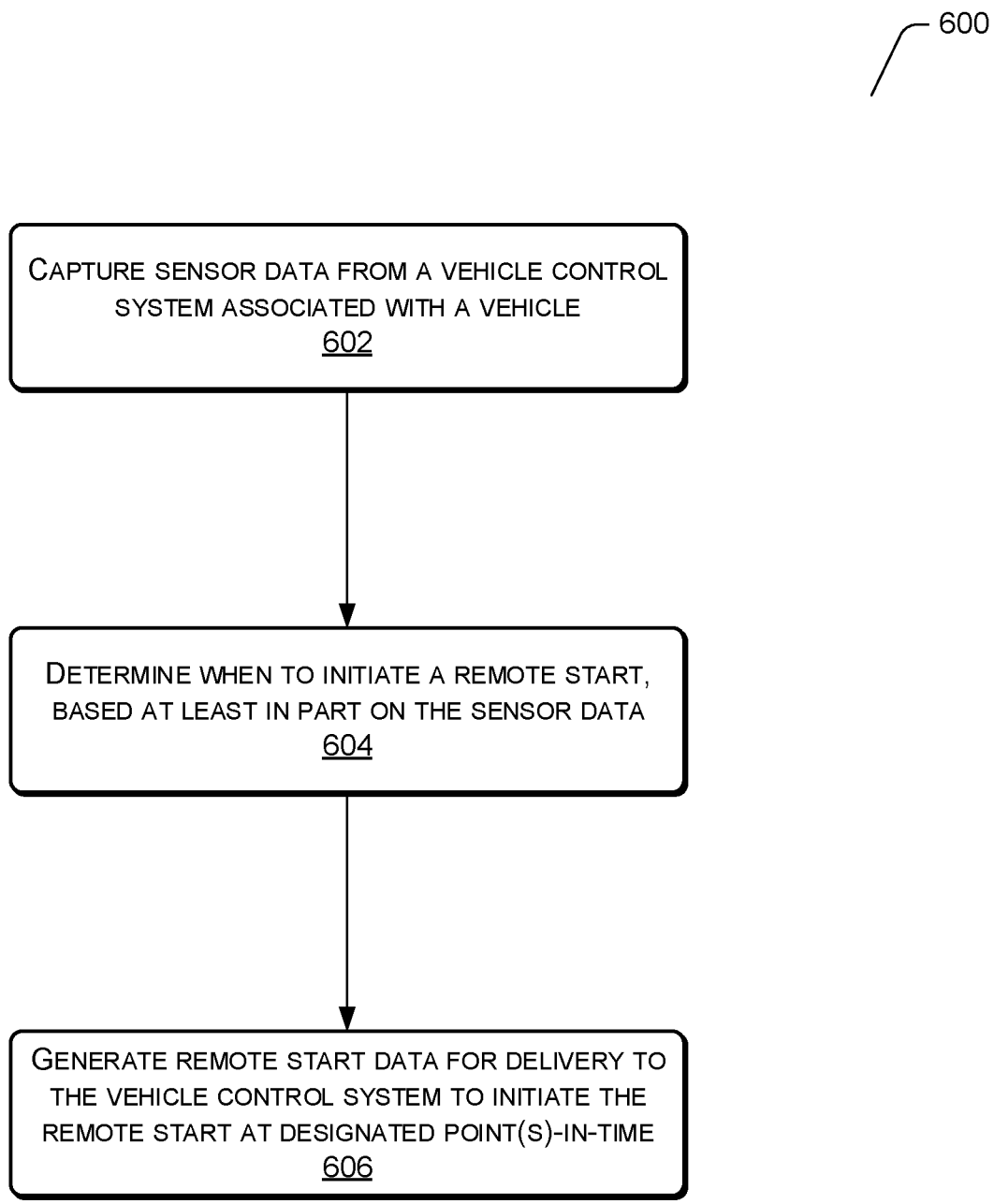
FIG. 6 illustrates an exemplary process of determining a point-in-time to initiate a remote start of a vehicle based on monitored environmental conditions, in accordance with one embodiment.

FIGS. 5 and 6 present processes 500 and 600 that relate to operations of the Vehicle Remote start controller 102. Each of processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the computing environment 100 of FIG. 1.

FIG. 5 illustrates an exemplary process for determining whether to initiate a remote start of a vehicle, in accordance with one embodiment. The remote start may include a remote engine start, a remote start of vehicle cabin environment controls, or a suitable combination of both. Process 500 is described from the perspective of the remote start controller.

At 502, the remote start controller may detect a triggering event to initiate a remote start of a vehicle. The triggering event may be receipt of a request from an operator device to initiate the remote start. Another triggering event may include an inference of an impending drive cycle based on an operator profile. Other triggering events may include detecting the presence of an occupant within the vehicle cabin, or an indication of a battery charge state that is below a predetermined battery charge threshold.

At 504, the remote start controller may capture, from a vehicle control system, sensor data from one or more sensors associated with the vehicle. The one or more sensors may include the vehicle sensors and vehicle idle sensor(s). In some examples, the vehicle idle sensor(s) may functionally overlap vehicle sensors.

At 506, the remote start controller may determine the current state of the vehicle based at least in part on the sensor data. The current state of the vehicle may identify factors specific to the vehicle or the vehicle environment that may influence whether to initiate a remote start or when to initiate a remote start. Factors specific to the vehicle may include, without limitation, a battery charge state or a fuel reserve state. Factors specific to the vehicle environment may include, without limitation, external environmental conditions, and whether the vehicle is parked indoors or outdoors.

At 508, the remote start controller may determine whether to initiate a remote start based at least in part on the current state of the vehicle and analysis of the sensor data. If the remote start controller elects to initiate the remote start, process 500 may proceed to block 510. Accordingly, at block 510, the remote start controller may generate remote start data for delivery to the vehicle control system of the vehicle. The remote start data may include computer-executable instructions that automatically initiate the remote start (e.g., remote engine start, the remote start of vehicle cabin environment controls, or a suitable combination of both) at a specific point-in-time.

Otherwise, if the remote start controller elects to not initiate the remote start, the process 500 may proceed to block 512. At 512, the remote start controller may generate a message for delivery to an operator device associated with the vehicle that indicates a denial to remote start the vehicle.

FIG. 6 illustrates an exemplary process of determining a point-in-time to initiate a remote start of a vehicle based on monitored environmental conditions, in accordance with one embodiment. Environmental conditions may include external environmental conditions at a geolocation of the vehicle or ambient conditions, such as vehicle cabin temperature, within the vehicle cabin. Process 600 is described from the perspective of the remote start controller.

At 602, the remote start controller may capture sensor data from a vehicle control system associated with the vehicle. The remote start controller may capture the sensor data continuously, per a predetermined schedule, or in response to a triggering event. The predetermined schedule may be any suitable time interval, such as five minutes, ten minutes, or 30 minutes. The triggering event may include, without limitation, receipt of a request from an operator device to initiate a remote start.

The sensor data may include, without limitation, external environmental conditions at the geolocation of the vehicle and ambient conditions (e.g., vehicle cabin temperature) within the vehicle cabin.

At 604, the remote start controller may determine when to initiate a remote start, based at least in part on the sensor data. For example, the remote start controller may elect to initiate a remote engine start at an earlier point-in-time than what is typical for a set departure time, based on external environmental conditions. Further, the remote start controller may set the point-in-time to initiate a remote control of vehicle cabin environment controls based on the vehicle cabin temperature.

At 606, the remote start controller may generate remote start data for delivery to the vehicle control system of the vehicle. The remote start data may initiate the remote start of the vehicle as two separate actions, namely a remote engine start and a remote start of vehicle cabin environment controls. The remote engine start may be initiated at a point-in-time dictated by the external environmental conditions. The remote start of vehicle cabin environment controls may be initiated at another point-in-time dictate by the vehicle cabin temperature.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A controller, comprising:
    one or more processors; and
    memory coupled to the one or more processors, the memory including one or more modules that are executable by the one or more processors to:
        retrieve sensor data associated with a vehicle having an engine;
        analyze the sensor data to determine a current environmental state of the vehicle;
        retrieve, from a data store, historical instances of drive cycles performed by an operator of the vehicle, wherein a drive cycle is a time period between starting the engine and subsequently shutting down the engine;
        generate a data model that correlates the operator with the historical instances of drive cycles;
        infer an impending occurrence of a drive cycle, based at least in part on the data model;
        determine whether to initiate a remote start of the vehicle based at least in part on the current environmental state and an inference of the impending occurrence of the drive cycle; and
        in response to determining to initiate the remote start, automatically generate and transmit computer-executable instructions for delivery to the vehicle to initiate the remote start.

2. The controller of claim 1, wherein the one or more modules are further executable by the one or more processors to:
    receive, from an operator device, a request to initiate the remote start of the vehicle, and
    wherein, to retrieve the sensor data is based at least in part on the request.

3. The controller of claim 1, wherein the one or more modules are further executable by the one or more processors to:
    determine a geolocation of the vehicle, based at least in part on the sensor data; and
    retrieve, from a third-party server, external environmental data associated with the geolocation, and
    wherein to determine the current state of the vehicle is based at least in part on the external environmental data.

4. The controller of claim 1, wherein the one or more modules are further executable by the one or more processors to:
    determine ambient conditions within an interior cabin of the vehicle, based at least in part on the sensor data, and
    wherein to determine the current state of the vehicle is based at least in part on the ambient conditions.

5. The controller of claim 1, wherein the one or more modules are further executable by the one or more processors to:
    detect an occupant within an interior cabin of the vehicle, based at least in part on the sensor data, and
    wherein to determine the current state of the vehicle is based at least in part on detecting the occupant.

6. The controller of claim 1, wherein the one or more modules are further executable by the one or more processors to:
    determine a battery charge state of charge for the vehicle, and wherein to determine the current state of the vehicle is based at least in part on the battery charge state of charge.

7. The controller of claim 1, wherein the one or more modules are further executable by the one or more processors to:
determine whether the vehicle is located within an indoor area or an outdoor area, based at least in part on the sensor data, and
wherein to determine the current state of the vehicle is based at least in part on the vehicle being located in the indoor area or the outdoor area.

8. The controller of claim 1, wherein the one or more modules are further executable by the one or more processors to:
determine ambient conditions within an interior cabin of the vehicle; and
in response to determining to initiate the remote start, determine a point-in-time prior to the impending occurrence of the drive cycle to initiate the remote start, based at least in part on the ambient conditions,
wherein, the computer-executable instructions are further configured to initiate the remote start at the point-in-time.

9. The controller of claim 1, wherein the one or more modules are further executable by the one or more processors to:
in response to determining not to initiate the remote start, generate a message for delivery to an external operator device associated with the vehicle, the message indicating at least that the remote start is determined not to be initiated.

10. One or more non-transitory computer-readable media collectively storing computer-executable instructions that, when executed with one or more processors, collectively cause the computers to perform acts comprising:
retrieving, from one or more sensors of a vehicle having an engine, sensor data associated with the vehicle;
retrieving, from a data store, historical instances of drive cycles performed by an operator of the vehicle, wherein a drive cycle is a time period between starting the engine and subsequently shutting down the engine;
generating a data model that correlates the operator with the historical instances of drive cycles;
inferring an impending occurrence of a drive cycle, based at least in part on the data model;
determining a current state of the vehicle, based at least in part on the sensor data;
determining whether to initiate a remote start of the vehicle based at least in part on an inference of the impending occurrence of the drive cycle and the current state of the vehicle; and
in response to determining to initiate the remote start, automatically generating and transmitting, to the vehicle, computer-executable instructions that initiate the remote start.

11. The one or more non-transitory computer-readable media of claim 10, wherein the acts further comprise:
determining a geolocation of the vehicle, based at least in part on the sensor data;
retrieving, from a third-party server, external environmental data associated with the geolocation; and
determining external environmental conditions at the vehicle, based at least in part on the external environmental data,
wherein determining whether to initiate the remote start is further based at least in part on the external environmental conditions.

12. The one or more non-transitory computer-readable media of claim 11, wherein the acts further comprise:
in response to determining to initiate the remote start, determining a point-in-time prior to the impending occurrence of the drive cycle to initiate the remote start, based at least in part on the external environmental conditions,
wherein, the computer-executable instructions are further configured to initiate the remote start at the point-in-time.

13. The one or more non-transitory computer-readable media of claim 10, wherein the one or more sensors include vehicle instrument sensors and vehicle cabin sensors, the vehicle instrument sensors include at least one of a Global Positioning Sensor (GPS) sensor, a fuel level sensor and a battery charge state of charge sensor, and the vehicle cabin sensors include at least one of a thermal sensor, a temperature sensor, an accelerometer, a motion sensor, or an audio sensor.

14. A controller, comprising:
one or more processors; and
memory coupled to the one or more processors, the memory including one or more modules that are executable by the one or more processors to:
retrieve sensor data from a vehicle having an engine;
retrieve, from a data store, historical instances of drive cycles performed by an operator of the vehicle, wherein a drive cycle is a time period between starting the engine and subsequently shutting down the engine;
generate a data model that correlates the operator with the historical instances of drive cycles;
infer an impending occurrence of a drive cycle, based at least in part on the data model;
analyze the sensor data to determine a current environmental state of the vehicle;
determine a geolocation of the vehicle, based at least in part on the sensor data;
retrieve, from a third-party server, external environmental data associated with the geolocation;
detect an occupant within an interior cabin of the vehicle, based at least in part on the sensor data;
wherein to determine the current state of the vehicle is based at least in part on the sensor data, the current environmental state of the vehicle, the external environmental data, and detecting the occupant;
determine a time period associated with the vehicle being idle, based at least in part on the sensor data,
determine whether to initiate a remote start of the vehicle based at least in part on the current state of the vehicle, an inference of the impending occurrence of the drive cycle, and the time period being greater than or equal to a predetermined idle threshold;
determine ambient conditions within an interior cabin of the vehicle;
determine a point-in-time prior to the impending occurrence of the drive cycle to initiate the remote start, based at least in part on the ambient conditions, wherein the computer-executable instructions are further configured to initiate the remote start at the point-in-time;

in response to determining to initiate the remote start, automatically generate and transmit computer-executable instructions to the vehicle to initiate the remote start; and in response to determining not to initiate the remote start, generate a message for delivery to an operator device associated with the vehicle, the message indicating at least that the remote start is determined not to be initiated.

15. The controller of claim 14, wherein the sensor data includes an indication of a remaining fuel reserve of the vehicle, and the one or more modules are executable by the one or more processors to:

infer an expected fuel consumption associated with the impending occurrence of the drive cycle, wherein, determining whether to initiate the remote start is further based at least in part on an analysis of the remaining fuel reserve relative to the expected fuel consumption.

\* \* \* \* \*